United States Patent [19]

Chen

[11] Patent Number: 4,934,728

[45] Date of Patent: Jun. 19, 1990

[54] FOLDING CART

[76] Inventor: Franys Chen, No. 73, Jih-Nan Li, Ta-Chia Chen, Taichung Hsien, Taiwan

[21] Appl. No.: 397,668

[22] Filed: Aug. 23, 1989

[51] Int. Cl.⁵ .................................................. B62B 7/06
[52] U.S. Cl. .................................... 280/644; 280/650; 280/47.4
[58] Field of Search ............... 280/642, 644, 647, 650, 280/47.38, 47.4, 62, 649; 297/46, 325, 326, 354

[56] References Cited

U.S. PATENT DOCUMENTS

| | | | |
|---|---|---|---|
| 688,039 | 12/1901 | Tillinghast | 280/644 |
| 2,120,425 | 6/1938 | Frey | 280/644 |
| 2,410,797 | 11/1946 | Allenbaugh | 280/47.4 |

Primary Examiner—Charles A. Marmor
Assistant Examiner—Michael Mar
Attorney, Agent, or Firm—Brumbaugh, Graves, Donohue & Raymond

[57] ABSTRACT

A three-wheeled cart includes a frame body whose rear portion is supported by a pair of rear wheels. An inclined, elongated U-shaped tube which has an upper handle portion and a lower turnable transverse connecting tube is pivoted to the frame body. A front fork member carrying a front wheel is attached to the turnable connecting tube. The front fork member supports the front portion of the frame body when the cart is in use and can be turned rearward to place the front wheel between the rear wheels when not in use.

6 Claims, 4 Drawing Sheets

1

FOLDING CART

BACKGROUND OF THE INVENTION

This invention relates to a cart incorporating three wheels such as a baby cart or the like, and particularly to a three-wheeled cart in which a single front wheel is attached to a turnable holding member so that the front wheel can be placed in between two rear wheels when the cart is not in use.

The present invention provides an improvement in a conventional non-folding three-wheeled cart, for example, a baby cart which is shown in FIG. 1. An object of the present invention is to provide a foldable three-wheeled cart which can be compacted for storage when the cart is not in use.

SUMMARY OF THE INVENTION

According to the invention, a cart include a frame body having a rear portion, a front portion, and two spaced apart side fence members interconnecting said rear and front portions. The front portion has a bottom transverse tube portion with two ends being connected to the side fence members. The bottom transverse tube portion is detachable from the frame body. A pair of rear wheels are attached to the bottom side of the rear portion. A U-shaped tube has two arm portions which extend in between and respectively pivoted to the side fence members, and an upper transverse handle portion is connected to the arm portions. A transverse connecting member is connected to the bottom ends of the arm portions, the transverse connecting member being posterior to and substantially lying in the same plane as the bottom transverse tube portion of the frame body. A front fork member has a rear end connected to the transverse connecting member and a front end portion which extends below and support the bottom transverse tube portion of the frame body and which has a downwardly bent portion. A front wheel is attached to the downwardly bent portion.

In one aspect of the invention, each side fence member includes a framing tube which has a rear end connected to one of the rear wheel, the framing tube extending upward from the rear end of the framing tube, then bent forward and subsequently downward to a front end, The rear portion of the framing tube has a transverse elongated member connected to the rear ends of the side fence members, while the bottom transverse tube portion of the front portion has two ends respectively connected to the front ends of the framing tubes of the side fence members. The arm portions of the U-shaped tube are pivoted to the framing tubes. A seat member which is made of sheetins is suspended from the U-shaped tube.

The present exemplary preferred embodiment will be described in detail with reference to the accompanying drawings, in which:

DETAILED DESCRIPTION OF THE PREFERRED EMBODIMENT

Figure 1:
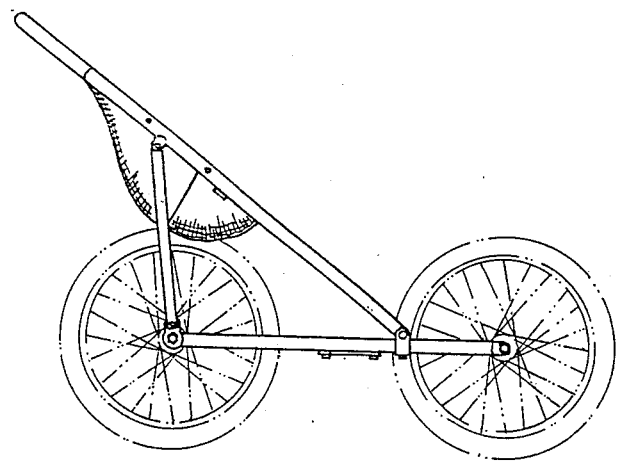
FIG. 1 is a view of a conventional three-wheeled cart.
Figure 2:
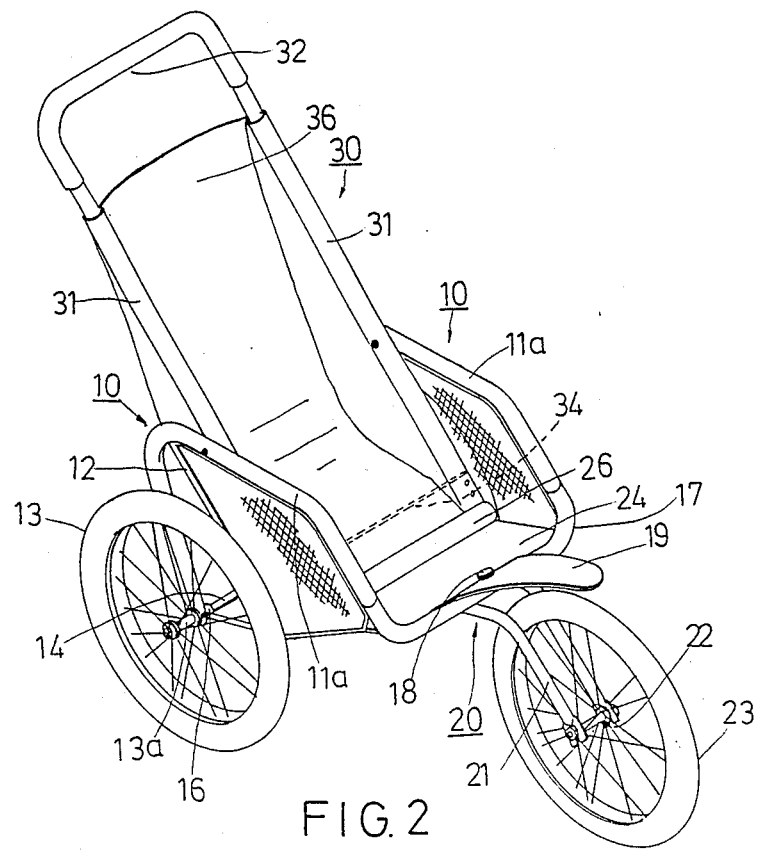
FIG. 2 is a perspective view of a cart embodying the present invention.
Figure 3:
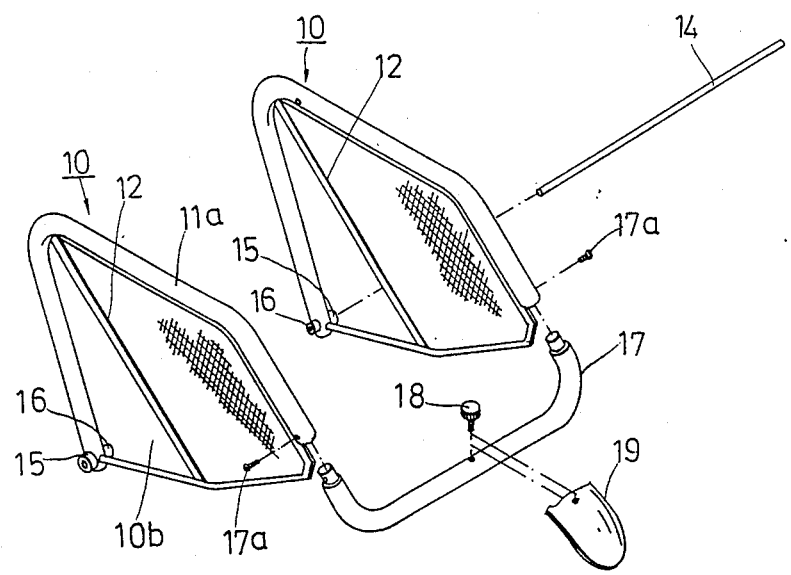
FIG. 3 is an exploded view of the frame body of the cart of FIG. 2.
Figure 4:
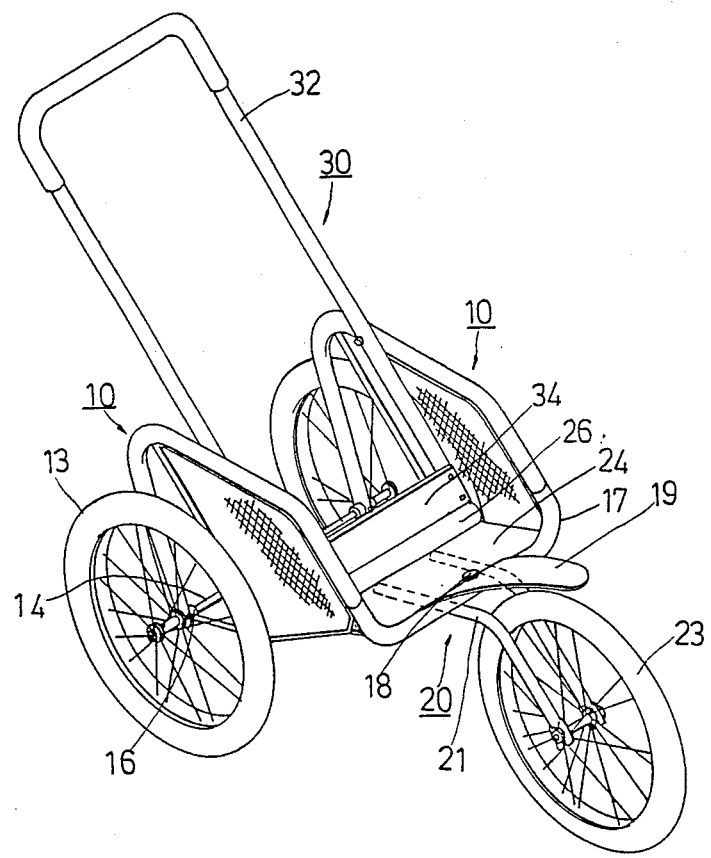
FIG. 4 is a perspective view of the cart of FIG. 2 in which the cart seat is removed.
Figure 5:
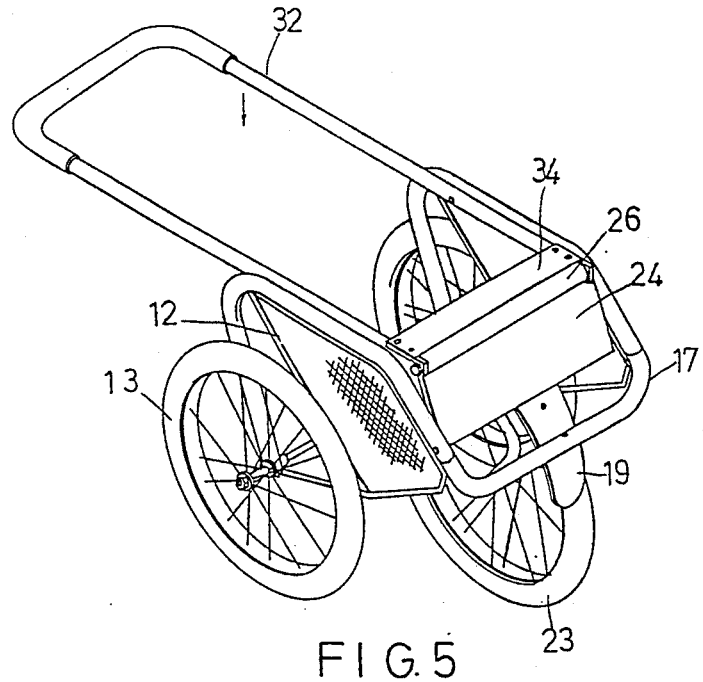
FIGS. 5 and 6 shows how the cart of FIG. 2 is collapsed.
Figure 6:
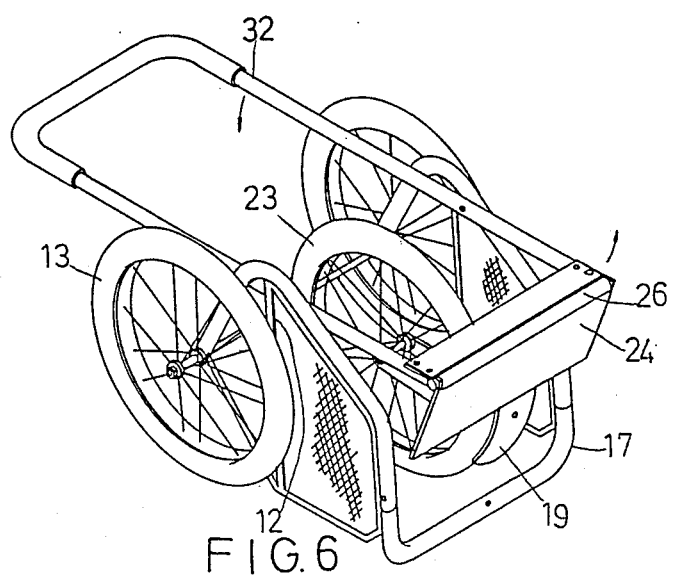

Referring to the drawings, a cart according to the present invention is shown, having a frame body which includes two spaced apart side fence members 10. Each fence member 10 is constituted of a bent tube 11a which extends upward from the rear end thereof, then bends forward and subsequently downward to its front end. A framed covering sheet 10b with a reinforcing rib 12 is attached to each bent tube 11a. To the rear end of each bent tube 11a are attached a journal piece 15 and a mounting sleeve member 16.

A connecting rod 14 is attached to the bent tubes 11a by means of the mounting sleeve members 16 which respectively receive the two ends of the rod 14. The front ends of the bent tubs 11a are connected to two ends of a front transverse tube 17 by means of screws 17a. A pair of rear wheels 13 are attached to the rear ends of the bent tubes 11a by means of journal pieces 15 which hold the shafts 13a of the wheels.

A U-shaped tube 30 is provided between the side fence members 10 and the two arm portions 31 thereof are respectively pivoted to the bent tubes 11a. An upper transverse handle portion 32 is connected to the arm portions 31. A tube-like connecting member 26 clamps firmly a radially extending plate 24 and is connected rotatably to the lower ends of the arm portions 31. The plate 24 serves as a paddle plate and can be turned about the axis of the tube-like connecting member 26. A mudguard plate 19 is welded to the paddle plate 24 and detachably connected to the front transverse tube 17 by means of a screw 18. Above the connecting member 26 is a transverse plate 34 which is fixed to the arms 31. A seat member 36 which is made of a flexible sheeting material is suspended from the U-shaped tube 30.

A front fork member 21 has a rear end welded to the transverse tube-like connecting member 26 and extends forward from the rear end thereof. The connecting tube 26 and the transverse bottom tube 17 substantially lie on the same plane so that the fork member 21 extends below the paddle plate 24 and the bottom transverse tube 17. The front portion of the fork member 21 extends beyond the front transverse tube 17 and bends downward to a portion 21 which is connected to the shaft 22 of a front wheel 23.

It can be appreciated that the front fork 20 is turnable because it is connected to the turnable connecting tube 26. However, when the cart is in use, the front fork 20 is immovable because the mudguard plate 19 is screwed to the front transverse tube 17 and the paddle plate 24 is thereby immobilized.

To fold the cart, the mudguard plate 19 is detached from the tube 17, and then the front fork member 20 is turned rearward so that the front wheel 23 is placed between the rear wheels.

With the invention thus explained, it is apparent that various modifications and variations can be made without departing from the scope of the invention. It is therefore intended that the invention be limited as indicated in the appended claims.

What I claim is:

1. A cart for use between an extended operative position and a folded stored position comprising:
    a frame body having a rear portion, a front portion, and two spaced apart side fence members interconnecting said rear and front portions, said front portion having a front transverse tube portion with two ends connected to said side fence members;

a pair of rear wheels attached to the bottom side of said rear portion of said frame body;

a U-shaped tube having two arm portions extending in between and respectively pivoted to said side fence members each arm portion having an upper end and a bottom end, and an upper transverse handle portion connected to the upper end of said arm portions, said U-shaped tube being inclined with respect to a vertical axis;

a transverse connecting member connected to the bottom ends of said arm portions, said transverse connecting member being rotatable about a transverse horizontal axis relative to said arm portions, said axis being located rearwardly of said front transverse tube portion of said frame body and lying substantially in the same horizontal plane as said front transverse tube portion of said frame body while in said operative position;

a front fork member having a rear end connected to said transverse connecting member and a front end having a downwardly bent portion which extends below said front transverse tube portion of said frame body, said front fork member supporting said front transverse tube portion while in said operative position;

a front wheel attached to said downwardly bent portion; and locking means for releasably locking said transverse connecting member in a fixed position relative to said front transverse tube while in said operative position.

2. A cart as claimed in claim 1, wherein each of said side fence members includes a framing tube which has a rear end connected to one of said rear wheels, said framing tube extending upward from said rear end, then bending forward and subsequently downward to a front end, each of said side fence members further having a covering sheet held by said framing tube.

3. A cart as claimed in claim 2, wherein said rear portion of said frame body has a transverse elongated member connected to said rear ends of said framing tubes, said front transverse tube portion having two ends respectively connected to said front ends of said framing tubes.

4. A cart as claimed in claim 3, wherein said transverse connecting member includes a transverse tube-like member and a transverse plate which is fixed to and extends radially from said transverse tube-like member, said locking means including means for detachably securing said transverse plate to said front transverse tube portion of said frame body.

5. A cart as claimed in claim 4, wherein said arm portions of said U-shaped tube are pivoted to said framing tubes.

6. A cart as claimed in claim 5, further including a seat member which is made of a flexible sheeting material and which is suspended from said U-shaped tube.

* * * * *